C. E. ROBSON.
BALL BEARING.
APPLICATION FILED MAR. 25, 1914.
1,148,336.
Patented July 27, 1915.
2 SHEETS—SHEET 1.
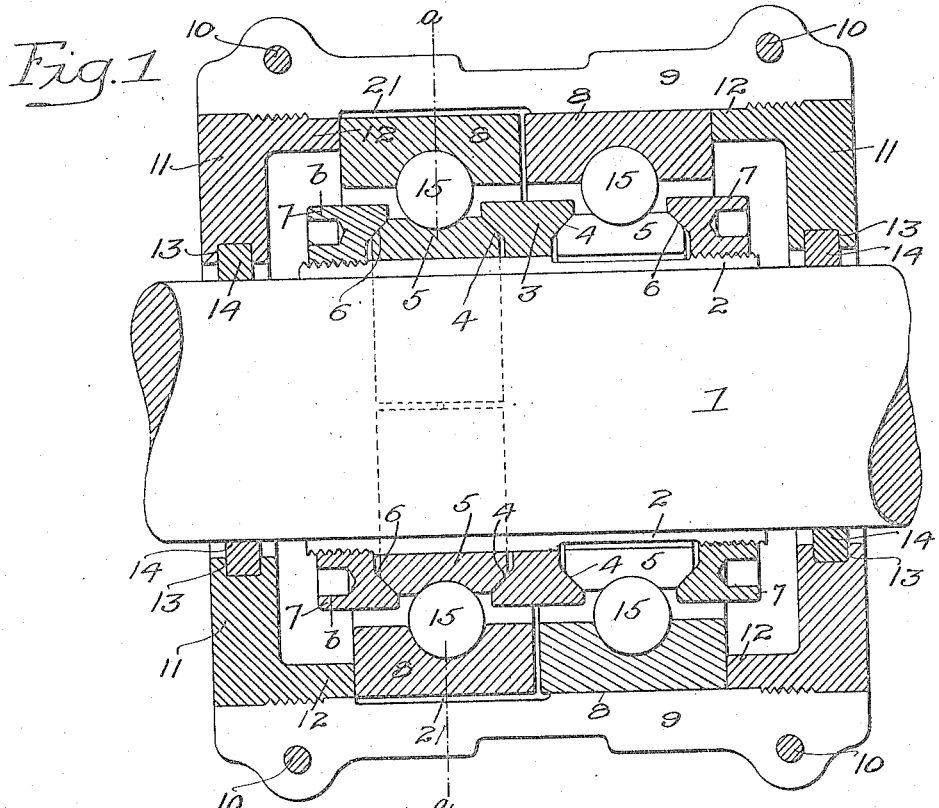
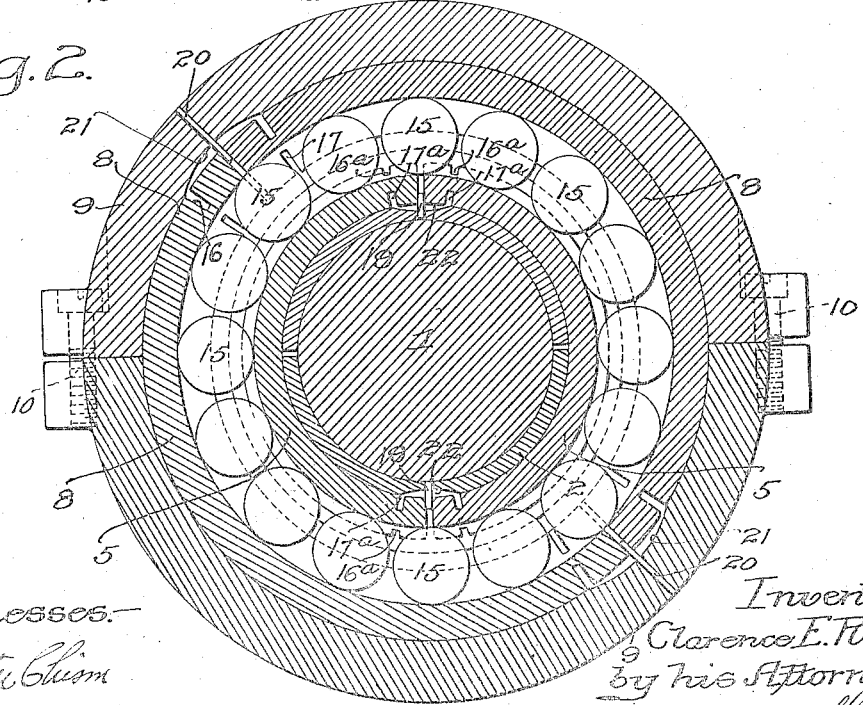

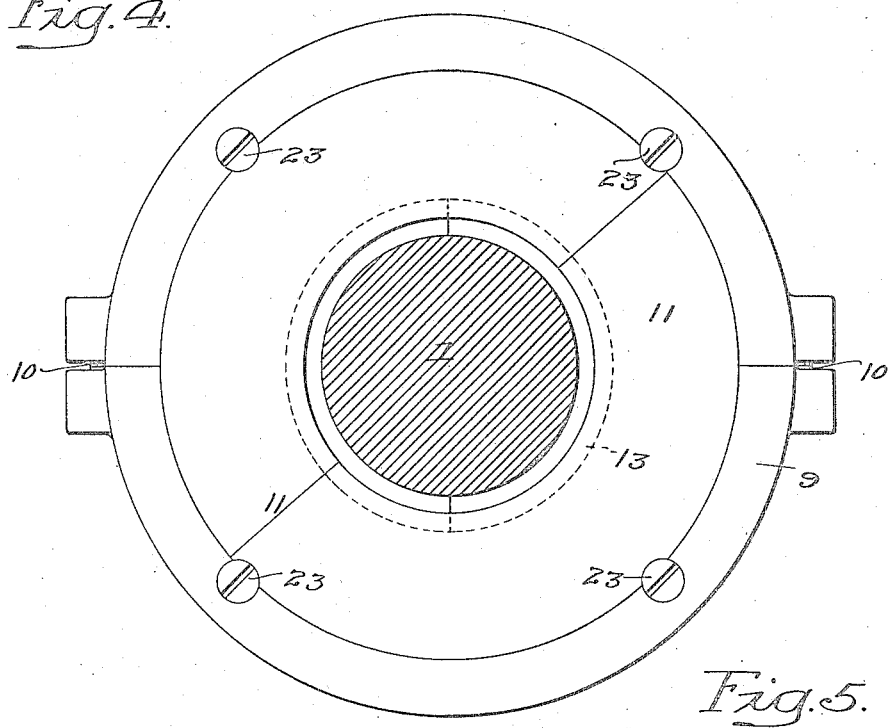
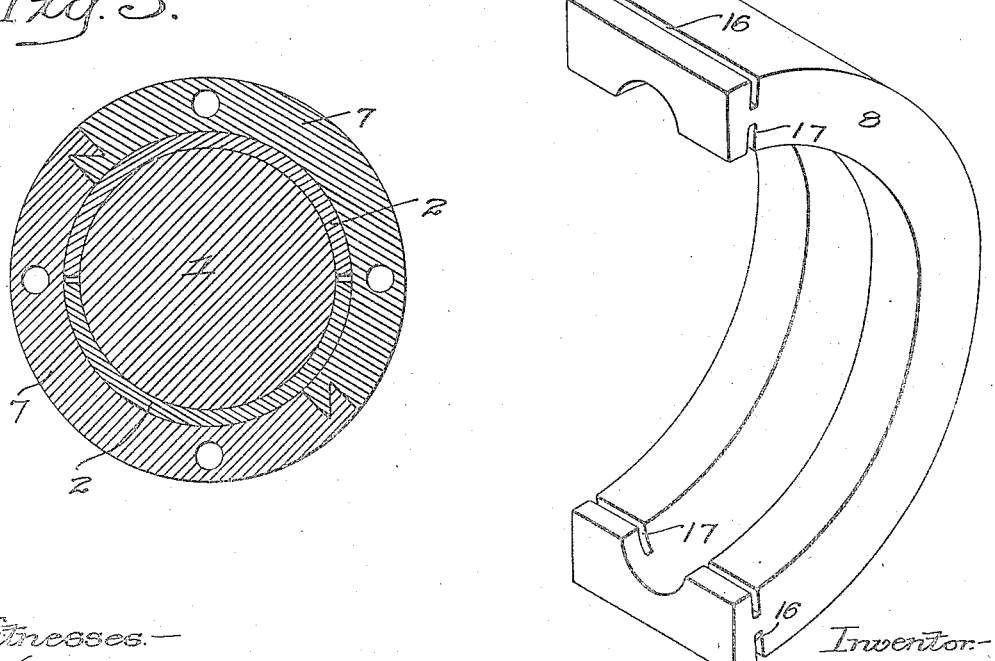

UNITED STATES PATENT OFFICE.

CLARENCE E. ROBSON, OF PHILADELPHIA, PENNSYLVANIA, ASSIGNOR OF ONE-HALF TO FRANK SORENSEN, OF PHILADELPHIA, PENNSYLVANIA.

BALL-BEARING.

1,148,336.

Specification of Letters Patent.

Patented July 27, 1915.

Application filed March 25, 1914. Serial No. 827,132.

*To all whom it may concern:*

Be it known that I, CLARENCE E. ROBSON, a citizen of the United States, residing in Philadelphia, Pennsylvania, have invented certain Improvements in Ball-Bearings, of which the following is a specification.

One object of my invention is to construct a ball bearing which can be applied to a shaft at any point desired without removing any of the elements carried by the shaft.

This object I attain by making the parts of the ball bearing in halves so that, when assembled, they will readily support the shaft.

A further object of the invention is to construct the bearing so that the race for the balls will be relieved of pressure at the points where the splits occur.

In the accompanying drawings:—Figure 1, is a sectional plan view of my improved ball bearing, the shaft being in full lines; Fig. 2, is a transverse sectional view on the line $a$—$a$, Fig. 1; Fig. 3, is a transverse sectional view on the line $b$—$b$, Fig. 1; Fig. 4, is an end view; and Fig. 5, is a perspective view of one section of one of the outer raceways.

Referring to the drawings, 1 is the shaft on which is mounted a two-part sleeve 2 and loosely mounted on this sleeve is a flange 3. This flange has a beveled undercut portion 4 at each side and bearing against this undercut portion are the segmental inner bearing rings 5 which are beveled at each side to conform to the bevel 4 of the central flange and the bevel 6 of the two-part nuts 7 which are screwed onto the threaded portions of the sleeve, as shown, so as to confine the bearing rings in the proper position. The nuts 7 and the flange 3 are made as shown in Fig. 3, having undercut grooves at each end of each section, and the projection on one section extends into the groove of the other section and locks the two sections firmly together, so that when the nuts are in position they are practically one unit, and, as the nuts are screwed onto the sleeve, they draw the sleeve firmly onto the shaft and the inner bearing rings onto the sleeve.

I preferably arrange the inner bearing rings 5 so that the divisions of one bearing ring are out of line with the divisions of the other bearing ring. In the present instance, the bearing is shown with two bearing rings. These bearing rings may be multiplied if desired without departing from the main features of the invention.

8, 8 are the outer bearing rings, each made in two sections and fitting the casing 9, which is also made in two sections. The two sections of the casing are secured together, in the present instance by transverse bolts 10, or other suitable fastenings.

11, 11 are heads which are screwed into the casing 9. The ends 12 of these heads bear against the outer bearing rings 8 and hold them in proper alinement with the inner bearing rings 5. The heads have openings considerably larger than the shaft and they also have annular grooves 13 for the reception of packing 14, so as to prevent dust or dirt gaining access to the interior of the bearing, and these packing rings also hold the lubricant in the casing.

15, 15 are two series of balls located between the inner and outer bearing rings, and each ring is grooved to form a race-way for the balls.

In order to prevent the balls from wearing the rings at the corners, where one section is located close to another section, I form transverse slots 16 and 17, one at each side near each end of the outer bearing rings 8, as clearly illustrated in Fig. 5. I also form slots 16ª and 17ª in the inner bearing ring, one at each side near each end of the sections, as clearly shown in Figs. 2 and 5. These slots are of a depth to allow the metal from which the rings are made to yield slightly in order to relieve the corners of pressure and, consequently, to prevent the rapid wearing of the corners or the cutting of the balls.

In order to prevent the inner bearing rings 5 from turning on the sleeve, I provide pins 19, which project from the sleeve 2 and into the space between the sections of the bearing, and, in order to prevent the outer bearing rings 8 from turning independently of the outer casing 9, I provide pins 20 for the same purpose.

It will be noticed that, in order to allow the ends of the outer bearing rings to yield, the outer casing is cut away, as at 21, and the sleeve is cut away, as at 22, to allow the ends of the inner bearing rings to yield. Screws 23 may be used, if desired, to prevent the heads 11 from turning in the casing 9, or other means of fastening may be employed. The exterior of the casing can be formed in any suitable manner to accommodate any particular style of hanger; the construction depending upon the special type of hanger or support which it is desired to use.

From the above description it will be seen that I am enabled to make a bearing which can be applied to a line shaft at any point desired, as each element of the bearing is made, in the present instance, in two sections and these sections are so assembled that the parting line of one element is out of line with the parting line of the other element. By making the inner and the outer bearing rings in the manner shown, I prevent the rapid wearing away of the segments of the bearing rings at the ends of the segments and I also prevent the cutting of the balls, insuring a longer life to the bearing.

I have shown the two sets of balls arranged comparatively close together, but they may be spaced any distance apart as desired.

I claim:—

1. The combination in a ball bearing for a shaft, of a two-part sleeve arranged to be mounted on the shaft, said sleeve being of an even diameter throughout; a two-part under-cut flange loose on the sleeve so that it can be adjusted longitudinally thereon; a two-part undercut nut mounted on each end of the sleeve; a two-part inner bearing mounted at each side of the flange and shaped to conform to the undercut portions of the flange and nut and confined in position by one of said nuts; two two-part outer bearing rings, one outer bearing ring being in line with one inner bearing ring and the other outer bearing ring being in line with the other inner bearing ring; a two-part casing; and a series of balls mounted between each set of inner and outer bearing rings.

2. The combination of a shaft; a sleeve mounted thereon; an inner bearing ring made in two parts and confined to the sleeve; an outer bearing ring made in two parts; a series of balls located between the two rings and a two-part casing retaining the outer bearing ring, the ends of each section of each bearing ring being grooved transversely to form yielding end sections to relieve the balls as they pass over the joints between the sections of the rings.

3. The combination of a shaft; a two-part sleeve mounted thereon; a two-part under-cut flange on the sleeve; a nut mounted on each end of the sleeve and having a plurality of parts; two inner rings, each made of a plurality of parts, one ring being mounted between the central flange and one nut, and the other ring being mounted between the central flange and the other nut; means for preventing the rings turning on the sleeve; two outer rings having a plurality of parts, said outer rings being in line with the inner rings; a casing inclosing the outer rings, said casing being made in two parts; means for preventing the rings turning in the casing; two series of balls, one series being mounted between one set of rings and the other series of balls being mounted between the other series of rings; casing, the outer bearing rings being so constructed as to allow the outer rings to accommodate themselves to the balls.

4. A ring forming a race-way for a ball bearing made in a plurality of parts, each section of the ring being weakened at a point slightly back of its end so that the end of the ring will yield to relieve it from pressure.

5. A bearing ring forming a race-way for a ball bearing made in a plurality of parts, each part being grooved transversely both inside and outside near the end so as to allow the end to yield slightly to relieve the ring from pressure at the joints.

In testimony whereof, I have signed my name to this specification, in the presence of two subscribing witnesses.

CLARENCE E. ROBSON.

Witnesses:
WALTER F. PULLINGER,
WM. A. BARR.